Nov. 15, 1938.  G. M. BOOTH  2,137,204
PRESSURE REDUCING AND REGULATING VALVE
Filed June 2, 1936
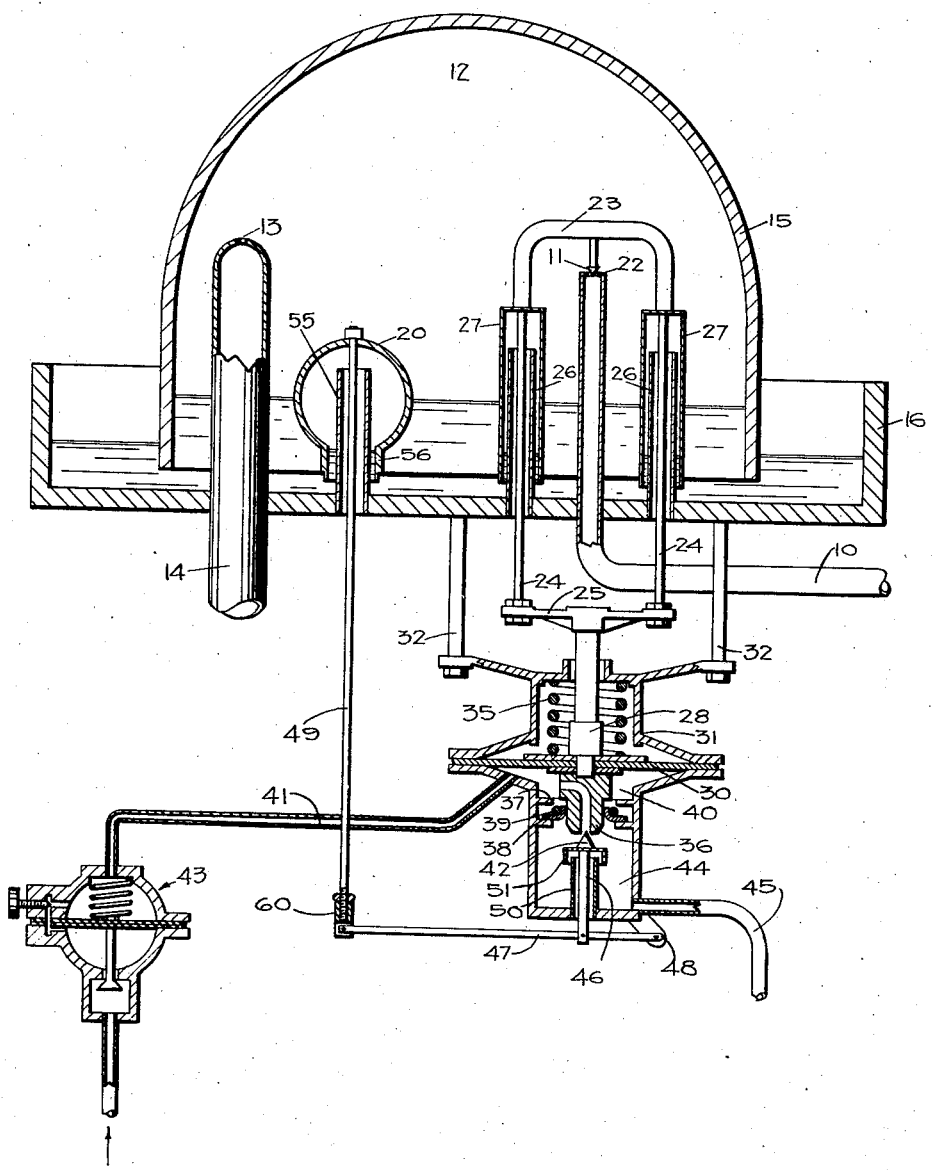
INVENTOR.
George M. Booth
BY Arthur L. Kent
his ATTORNEYS.

Patented Nov. 15, 1938

2,137,204

UNITED STATES PATENT OFFICE 2,137,204

PRESSURE REDUCING AND REGULATING VALVE

George M. Booth, Westfield, N. J., assignor to Wallace & Tiernan Company, Inc., Belleville, N. J., a corporation of New York Application June 2, 1936, Serial No. 83,022

8 Claims. (Cl. 210—28)

This invention relates to a pressure reducing and regulating valve for supplying gas at a constant pressure.

The invention aims to provide an improved regulating valve which is highly accurate and reliable in operation, supplying gas at the desired reduced pressure without appreciable variation therefrom over a wide range of flow rate and under wide variations in the inlet pressure. The invention has been made especially with the idea of providing an improved float-controlled valve for supplying gas at a constant substantially atmospheric pressure which may be somewhat under or somewhat over atmosphere. The invention in its broader aspects is, however, not limited to a float controlled valve, nor is a float-controlled valve according to the invention useful only for supplying the gas at a substantially atmospheric pressure.

Pressure reducing valves according to the invention are power operated, the control member responsive to the gas pressure on the discharge side of the valve serving merely to control the operation of motor means by which a movable valve member is moved. In a device embodying the invention in the form now considered best, the gas is admitted through a valve-controlled inlet to a float chamber to which water is supplied under a constant head and which has a gas outlet, and the inlet valve is connected to a movable operating member subject to a pressure constantly tending to move it in one direction and which is movable in the other direction by the pressure of liquid in a chamber to which liquid is supplied at a constant rate and from which outflow of the liquid is controlled by a valve device comprising two cooperating members one connected to move with the control member and the other connected to be moved by the float.

In the operation of the apparatus, if gas is flowing out of the float chamber faster than it is entering the chamber through the gas inlet, the water level in the chamber will rise until by upward movement of the float the valve controlling the outflow of liquid from the liquid pressure chamber has been closed sufficiently to cause an increase in pressure in the pressure chamber whereby the operating member is moved to open the gas inlet valve. Movement of the operating member to open the gas inlet valve also opens the liquid valve, but until the desired pressure is obtained in the float chamber, the float will continue to rise and move the valve member connected to it in the direction to close the liquid valve. When by increased inflow of gas the desired gas pressure is attained in the float chamber the two valves will come to rest. If the outflow of gas from the float chamber is less than the inflow, the pressure in the chamber will rise and the water level in the chamber will fall, and the float will move downward and open the liquid valve, thereby reducing the liquid pressure on the operating member so that the member will move to give closing movement to the gas valve to reduce the inflow of gas. If the supply of pressure liquid is cut off, the constant pressure means will force the operating member in the direction to close the gas inlet valve and prevent further flow of gas into the float chamber.

A full understanding of the invention can best be given by a detailed description of an approved construction embodying all features of the invention, and such a description will now be given in connection with the accompanying drawing which shows such a construction in section.

The drawing shows a construction which is especially intended for supplying chlorine gas at a controlled rate for the treatment of water or watery liquids, in which the gas, supplied at a constant substantially atmospheric pressure by a pressure reducing valve, is withdrawn through a flow-controlling orifice by a controlled suction, such a construction as, for example, is shown in the Wallace U. S. Patent No. 1,777,986.

Referring to the drawing, the gas from a supply under suitable pressure flows through a tube 10 past a valve 11 into a chamber 12 from which the gas is drawn through an orifice 13 and tube 14. The chamber 12 is formed by a bell jar 15 standing open end down in a tray 16 in which water is maintained at a constant level outside the bell jar and from which water has free access to the space within the bell jar, as by having the bell jar supported so as to provide for the passage of water beneath its lower edge. Water may be supplied to and maintained at a constant level in the tray outside the bell jar by any suitable means. The gas inlet valve 11 is controlled by a float 20.

If in the operation of the apparatus gas is withdrawn from the chamber 12 faster than it is entering past the valve 11, the pressure within the chamber is thereby reduced, and as the pressure is reduced water rises in the chamber, and when the water rises above the level corresponding to the desired negative pressure to be maintained within the chamber upward movement of the float causes an opening movement of the valve to permit more gas to enter the chamber. If the gas enters the chamber faster than it is withdrawn from the chamber, the water level within the chamber is depressed, permitting the float to fall, and this causes a closing movement of the valve. Equilibrium is established, and under control of the float the desired negative pressure is maintained within the chamber, the valve being controlled to cause gas to be supplied to the chamber at the rate at which it is drawn from the chamber through the outlet orifice and tube 14.

Instead of having the gas inlet valve operated directly by the float as in the Wallace patent referred to, the valve is moved by motor means and the float serves merely to control the operation of the motor means. The gas supply tube 10 extends upward through the bottom of the tray 16 to above the maximum water level in the chamber 12, and the upper end of the tube is formed to serve, or provided with means to serve, as a seat 22 for the valve 11. The valve 11 is carried by a yoke 23 from which connecting rods 24 extend downward through the bottom of the tray 16 and are connected to opposite sides of a cross-head 25. The rods 24 pass freely through the bottom of the tray and the openings in the tray bottom are water-sealed by tubes 26 which extend upward from the tray bottom about the rods and tubes 27 which extend downward from the yoke 23 about the tubes 26 to near the tray bottom and below the level of the water in the tray outside the bell jar. A water seal is thus provided against the escape of gas through the tubes 26. The cross-head 25 is connected by a post 28 to a diaphragm 30 mounted within a casing 31 which is rigidly supported from the bottom of the tray 16 by means of studs 32.

A spring 35 presses constantly downward on the diaphragm 30, tending to move the diaphragm in the direction to close the valve 11. The diaphragm carries a downwardly extending nozzle member 36 which extends through a partition 37 by which the space within the diaphragm casing below the diaphragm is divided into an upper and lower chamber. A watertight, or substantially watertight, connection between the partition 37 and the nozzle 36 is made by means of a sealing leather 38 contracted about the nozzle by a garter spring 39. The space 40 between the diaphragm and the partition 37 serves as a pressure chamber to which water from a source under suitable pressure is admitted at a constant flow rate through a tube 41, and from which water flows through the nozzle 36 as permitted by a valve 42, the lower end of the nozzle being formed to serve as a valve seat co-operating with the valve 42. The supply of water to the pressure chamber is controlled by a constant flow rate valve 43 which maintains a constant flow rate within the operating range of the valve regardless of the inlet pressure to the valve or the pressure in the chamber. Water is discharged from the nozzle 36 into the chamber 44 beneath the partition 37 and passes to waste through tube 45.

The liquid valve 42 is carried by a rod 46 extending upward from a lever 47 one end of which is fulcrumed at 48 and the other end of which is pivotally connected to the lower end of a rod 49 extending down from the float 20, the arrangement being such that upward movement of the float moves the valve 42 upward and downward movement of the float moves the valve downward. A tube 50 extending upward from the bottom of the chamber 44 about the valve rod 46 prevents escape of water through the opening for the valve rod, and a shield 51 prevents water entering the top of the tube 50.

The connecting rod 49 extends upward through an opening in the bottom of tray 16 and through a frictionless water seal provided by a tube 55 extending upward from the tray bottom within the float and a skirt 56 extending down from the bottom of the float about the tube 55. Water will stand inside the skirt 56 at the elevation of the water in the tray outside the bell jar since the inside of the float is open to atmosphere through the tube 55.

When the tray 16 outside the chamber casing is open to atmosphere the apparatus operates to maintain a substantially atmospheric pressure in the chamber 12. The pressure maintained may be a slightly negative pressure as shown, or it might be a slightly positive pressure, dependent on the water level in the tray outside the chamber casing with relation to the elevation of the float 20 when in its normal operative position from which an upward movement causes an opening movement of the gas inlet valve and a downward movement causes a closing movement of the gas inlet valve.

In the apparatus as shown, when there is no suction drawing gas through the outlet orifice 13 the water level within the chamber 12 will be below the normal operating level indicated in the drawing, and the float will be below its normal operating range. The valve 42 will then be lowered and the valve seat 36 wide open so that no pressure can be built up within the pressure chamber 43 and the diaphragm will be depressed by the spring 35 and the valve 11 held down in closed position. Gas being then withdrawn through the orifice 13, the pressure within the chamber 12 is reduced and the water level within the chamber rises and the float rises. When the float has risen to a point where the valve 42 is lifted to throttle the outflow of water from the pressure chamber enough to cause sufficient pressure to be developed in the chamber 40 the diaphragm is forced upward against the pressure of the spring 35. Upward movement of the diaphragm opens the gas valve 11, but at the same time withdraws the nozzle seat from the valve 42, thus, by reducing the pressure in the chamber 40, limiting the upward movement of the diaphragm and the opening of the gas valve for any movement of the float. Continued rise of the float will move the valve 42 further upward, causing a further upward movement of the diaphragm and further opening of the gas valve to increase the flow of gas into the chamber 12, but also again withdrawing the nozzle seat from the valve 42. If as the result of these operations gas should be admitted to the chamber 12 faster than it is being withdrawn therefrom, and the pressure thereby increased above that desired to be maintained in the chamber and for which the float is set, the water level will fall below the normal operative water level and the downward movement of the float will open the valve 42, and the diaphragm will then be moved downward by the spring 35 and give a closing movement to the gas inlet valve and at the same time move the nozzle 36 downward to follow the movement of the valve 42 and again establish the balancing pressure against the diaphragm. These movements continue until the system comes to balance with the gas inlet opening to the chamber 12 just sufficient to pass the same quantity of gas which is being withdrawn through the orifice 13 and with the desired pressure in the chamber 12, this pressure in the apparatus as shown being a slightly negative pressure represented by the height of the water level within the chamber above the water level maintained in the tray 16 outside the chamber.

To provide for slight adjustment of the normal operating water level within the chamber 12, which determines the pressure maintained within the chamber 12, the float connecting rod 49 is made adjustable in length, as by adjusting means 60 such as indicated at the lower end of the rod.

The great accuracy with which the desired reduced pressure is maintained in the chamber 12 is due largely to the fact that the force of the gas acting on the gas inlet valve 11 is extremely small as compared to the forces acting on the diaphragm 30 to move the valve, and to the fact that the only force reacting on the float 28 is that of the water leaving the nozzle 36 on the valve 42. Although the float controls the positioning of the diaphragm 30 through the valve 42, this valve never actually touches its seat at the end of the nozzle.

The pressure developed in the chamber 40 is determined by the strength of the spring 35, and the change of pressure exerted by the spring over the whole movement of the diaphragm is only slight since the movement of the diaphragm is small and the spring has a low rate. The pressure maintained in the chamber 40 therefore varies only very slightly. Since the pressure in chamber 40 is nearly constant, and the flow of water into the chamber is constant, the opening past the valve 42 must be practically constant, except during times of adjustment, and even then the change in the valve opening is only very small and momentary. There is, therefore, a practically fixed relation between the valve 42 and nozzle 36, and because of this there is always a closely fixed relation between the float 20 and the gas inlet valve 11, so that the opening of the gas inlet valve for any position of the float will always be almost exactly the same. Other important advantages of the improved reducing valves are that in the event of failure of the pressure water supply to the pressure chamber 40, the gas inlet valve 11 is closed immediately and held closed by the force of the spring 35, and that the gas inlet valve will be similarly closed in the event of shut-down or failure of the means for withdrawing gas from the chamber 12.

What is claimed is:

1. A power operated pressure reducing valve, comprising a closed chamber having a gas inlet and a gas outlet, means for supplying water to a lower part of said chamber under a constant head, a valve for controlling the flow of gas into the chamber, a float in the chamber, motor means for operating said valve, and means operated by said float for controlling the operation of said motor means to close the valve when the float moves downward and to open the valve when the float moves upward.

2. A power operated pressure reducing valve, comprising a closed chamber having a gas inlet and a gas outlet, means for supplying water to a lower part of said chamber under a constant head, a valve for controlling the flow of gas into the chamber, a float in the chamber, motor means for operating said valve, means operated by said float for controlling the operation of said motor means to close the valve when the float moves downward and to open the valve when the float moves upward, said float-operated means including a connecting member extending from the float through an opening in the bottom wall of the chamber, and means providing a frictionless water seal for said connecting member.

3. A power operated pressure reducing valve, comprising a closed chamber having a gas inlet and a gas outlet, means for supplying water to a lower part of said chamber under a constant head, a gas valve for controlling the flow of gas into the chamber, a float in the chamber, a movable member connected to said gas valve, means tending to move said member in one direction to close the gas valve, means for supplying liquid pressure to move said member in the direction to open the gas valve, a valve for controlling said liquid pressure, and a connection between the float and the liquid valve whereby when the float rises said valve is operated to increase the liquid pressure on the control member to move the member in the direction to open the gas valve and when the float falls said valve is operated to decrease the liquid pressure on the control member to permit said member to move in the direction to close the gas valve.

4. A power operated pressure reducing valve, comprising a closed chamber having a gas inlet and a gas outlet, means for supplying water to a lower part of said chamber under a constant head, a gas valve for controlling the flow of gas into the chamber, a float in the chamber, a movable operating member connected to said gas valve, means tending to move said member in one direction to close the gas valve, means providing with said operating member a pressure chamber for containing liquid the pressure of which tends to move said member in the direction to open the gas valve, means for supplying pressure liquid at a constant rate to said pressure chamber, and means for controlling the outflow of liquid from said pressure chamber comprising cooperating valve members one of which is connected to move with said operating member and the other of which is movable toward and from the cooperating valve member in the direction of movement of said valve member and is connected to be moved by said float.

5. A power operated pressure reducing valve, comprising a closed chamber having a gas inlet and a gas outlet, means for supplying water to a lower part of said chamber under a constant head, a gas valve for controlling the flow of gas into the chamber, a float in the chamber, a movable operating member connected to said gas valve, means tending to move said member in one direction to close the gas valve, means providing with said operating member a pressure chamber for containing liquid the pressure of which tends to move said member in the direction to open the gas valve, means for supplying pressure liquid at a constant rate to said pressure chamber, an outlet nozzle carried by said member for outflow of liquid from the pressure chamber, the end of which nozzle forms a valve seat, a valve member movable toward and from said operating member to cooperate with said valve seat to vary the outlet from said pressure chamber and thereby the liquid pressure on said operating member, and connecting means between said valve member and the float for moving said valve member toward the operating member when the float moves upward and for moving said valve member away from the operating member when the float moves downward.

6. A power operated pressure reducing valve, comprising in combination with a valve for controlling gas flow into a gas space, a diaphragm connected to said valve, means tending to close said valve, means providing with said diaphragm a chamber for containing liquid the pressure of which on the diaphragm tends to move the diaphragm in the direction to open said valve, means for supplying pressure liquid at a constant rate to said chamber, means for controlling the outflow of liquid from said chamber comprising cooperating valve members one of which is connected to move with said diaphragm and the other of which is movable toward and from the cooperative valve member in the direction of movement of said valve member, and means responsive to the pressure in said gas space on the outlet side of said gas flow controlling valve for controlling the position of said last mentioned valve member.

7. A power operated pressure reducing valve, comprising a closed chamber having a gas inlet and a gas outlet, means for supplying water to a lower part of said chamber under a constant head, a gas valve for controlling the flow of gas into the chamber, a float in the chamber, a movable operating member connected to said gas valve, means tending to move said member in one direction to close the gas valve, means providing with said operating member a pressure chamber for containing liquid the pressure of which tends to move said member in the direction to open the gas valve, means for supplying pressure liquid at a constant rate to said pressure chamber, and means for controlling the outflow of liquid from said pressure chamber comprising means connected to be moved by said float to permit greater outflow of the liquid when the float falls and to reduce the outflow when the float rises and means responsive to movement of said operating member to reduce the outflow of the liquid as said operating member moves to close the gas valve and to permit greater outflow as said operating member moves to open the gas valve.

8. A power operated pressure reducing valve, comprising in combination with a valve for controlling gas flow into a gas space, a movable operating member connected to said valve, means tending to close said valve, means providing with said operating member a chamber for containing liquid the pressure of which tends to move said member in a direction to open said valve, means for supplying pressure liquid at a constant rate to said chamber, and means for controlling the outflow of liquid from said chamber comprising means responsive to the pressure in said gas space on the outlet side of the gas valve to permit greater outflow of the liquid when said pressure increases and to reduce the outflow when said pressure decreases and means responsive to movement of said operating member to reduce the outflow of the liquid as said member moves to close the gas valve and to permit greater outflow as said member moves to open the gas valve.

GEORGE M. BOOTH.